United States Patent [19]

Stedman et al.

[11] Patent Number: 4,764,408

[45] Date of Patent: Aug. 16, 1988

[54] FOAM PLASTIC BAFFLE FOR FLUID CONTAINERS

[75] Inventors: Donald R. Stedman; Robert M. Frankowiak, both of Auburn Hills, Mich.

[73] Assignee: Foamade Industries, Inc., Auburn Hills, Mich.

[21] Appl. No.: 144,980

[22] Filed: Jan. 19, 1988

[51] Int. Cl.⁴ .................. B23K 1/02; B65D 85/84; B32B 1/00; B32B 3/10

[52] U.S. Cl. ...................................... 428/71; 156/264; 206/524.7; 220/85 R; 220/88 R; 220/902; 428/76; 428/157; 428/159; 428/304.4; 428/316.6; 428/317.9; 428/913

[58] Field of Search ............... 206/524.7; 220/85 B, 220/85 R, 88 R, 902; 428/68, 69, 71, 76, 157, 158, 159, 160, 304.4, 316.6, 317.9, 319.7, 319.9, 912, 913; 156/264

[56] References Cited

U.S. PATENT DOCUMENTS

| | | | |
|---|---|---|---|
| 3,349,953 | 10/1967 | Conaway et al. | 220/88 R |
| 3,521,424 | 7/1970 | Wirfel | 428/71 |
| 3,563,837 | 2/1971 | Smith et al. | 428/71 |
| 3,650,431 | 3/1972 | Stewart | 220/88 R |
| 3,813,279 | 5/1974 | Varner, Jr. | 428/319.7 |
| 3,822,807 | 7/1974 | MacDonald et al. | 220/88 R |
| 4,124,116 | 11/1978 | McCabe | 428/913 |
| 4,224,366 | 9/1980 | McCabe | 428/304.4 |

Primary Examiner—William J. Van Balen
Attorney, Agent, or Firm—Cullen, Sloman, Cantor, Grauer, Scott and Rutherford

[57] ABSTRACT

A baffle for a liquid container, such as a vehicle gasoline tank or the like, is formed of a resilient, cellular foam plastic material placed within the container. The cells of the plastic are interconnected, and the volume of the solid material forming the foam plastic is only a minor portion of the overall volume of the material including its open cells. The plastic material is tightly compressed into a long strip which is surrounded by a casing formed of a thin sheet. The plastic material is chemically inert relative to the liquid, but the casing sheet is substantially soluble in the liquid. A predetermined length section of the strip may be inserted in a container. When liquid is poured into the container, the casing is substantially dissolved to free the compressed material, which resiliently expands to substantially fill the container and form a cellular baffle therein.

17 Claims, 1 Drawing Sheet

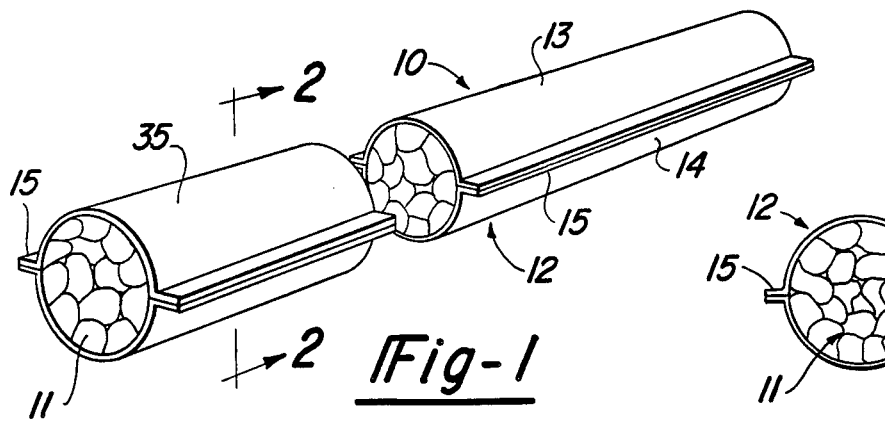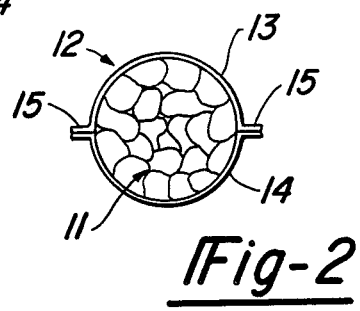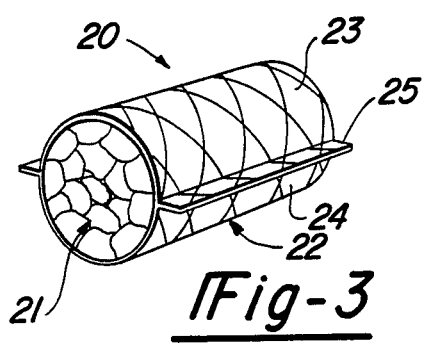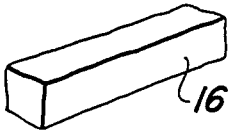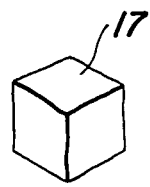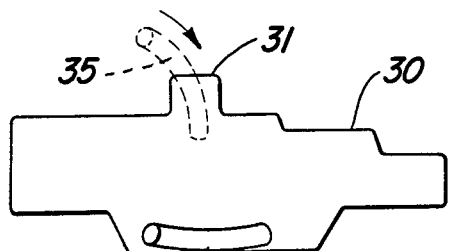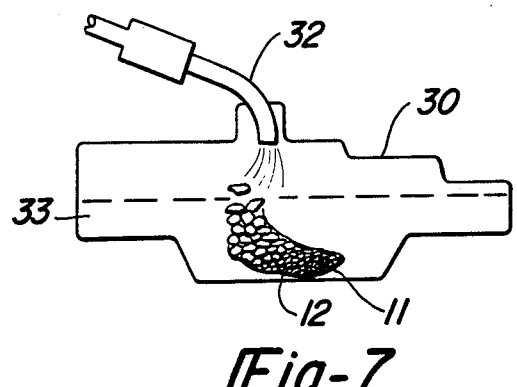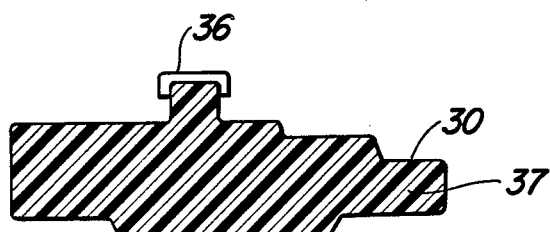

4,764,408

FOAM PLASTIC BAFFLE FOR FLUID CONTAINERS

BACKGROUND OF INVENTION

This invention relates to an improved method and filler material for filling the interior of a fluid storage container with an open-cell or reticulated plastic baffle.

Vehicles, such as automobiles, trucks, airplanes, boats, and the like, usually have one or more containers or tanks for holding liquids. Typically, the liquids are free to slosh about within these containers or tanks and to spurt out in the event of accidental rupture of the container. In some cases, the sloshing of free liquid, as for example in a partially filled gasoline tank containing a substantial amount of fuel is hazardous to the operation of the vehicle. The spillage of gasoline or other flammable material upon accidental rupture of the tank may result in flammable destruction of the vehicle. Thus, it is desirable to place baffles within such vehicle containers or tanks, which limit the free movement of the liquid within the container and limit the spurting of the liquid from a ruptured container.

One form of baffle used, for example, in aircraft constructions, comprises open cellular foam plastic material which is chemically inert to the particular liquid within the specific baffled container. However, filling the container with such plastic is relatively difficult and expensive and may require considerable labor for cutting foam plastic to fit within the container or to foam the plastic within the container. In addition, it has not been economically practical to commercially fill with foam plastic, or to enable the ordinary owner of a vehicle to fill, a container or tank within a vehicle after the tank is assembled and installed in the vehicle. Thus, it would be desirable to provide a method and material by which a manufacturer, a repair shop or an individual, without tools or technical training, could readily and quickly form a suitable foam plastic baffle within a vehicle's liquid containers or tanks, including gasoline tanks, windshield washer containers, coolant overflow containers, battery containers and the like, to eliminate liquid sloshing and the hazards due to rapid spurting or release of the liquid in the event of accidental rupture of the container.

SUMMARY OF INVENTION

This invention contemplates inserting an open cell or reticulated cellular plastic filler material within a container, such as a vehicle fuel tank or other containers in a vehicle, by tightly compressing the foam plastic material and surrounding it with a casing to form relatively narrow strips of compressed filler, inserting the strip, and then releasing the casing so that the material resiliently expands to fill the container. The plastic filler material is chemically inert to the liquid within the container. But, the casing is formed of a plastic material which is soluble in the liquid. Thus, a piece of such strip-like material may be physically inserted into the container through its opening, and when the casing dissolves, the foam filler material expands to fill the container.

The compressed filler material may be formed in long, sausage-like strips, from which predetermined length sections can be cut for insertion into a particular size container. The length of the section of the compressed filler is correlated to the volume of uncompressed filler needed to fill the interior of a particular volume container. Alternatively, predetermined size lengths of such material may be separately provided for use by an individual for his particular size container, as for example, the fuel tank or other container in a particular model automobile or truck.

One object of this invention is to provide a filler material, formed of small-size pieces, which may be physically inserted into a container, and which, upon being immersed in liquid in the container, will resiliently expand and fill the interior of the container, notwithstanding irregularities in the shape of the container. That is, the relatively small-size pieces of material are compressed together within a casing which will dissolve upon contact with the liquid that is normally placed in the container so that the filler material may resiliently expand into an open-cell baffle.

A further object of this invention is to provide a filler which may be formed of numerous, irregular-shaped pieces of foam plastic material, including material which might otherwise be scrap resulting from the manufacture of other products, wherein the material may be easily physically inserted into a container for filling the container to the degree desired for forming a baffle.

Yet another object of this invention is to provide a simple, inexpensive baffle-forming material which may be used to fill the interior of a vehicle container either during the time the container is manufactured or after the container is manufactured and assembled within a vehicle.

These and other objects and advantages of this invention will become apparent upon reading the following description, of which the attached drawings form a part.

DESCRIPTION OF DRAWINGS

FIG. 1 is a perspective view of a strip of compressed filler material and illustrating a section cut from the strip.

FIG. 2 is a cross-sectional view taken in the direction of arrows 2—2 of FIG. 1.

FIG. 3 is a perspective, fragmentary view of a section of the compressed filler strip showing an alternative, net-like casing.

FIG. 4 is a schematic illustration of an elongated piece of uncompressed filler-forming material.

FIG. 5 is a perspective view of small piece of roughly cube-shaped filler-forming material.

FIG. 6 is a schematic view of a container, such as an irregularly-shaped fuel tank, and shows the insertion of a compressed section of filler.

FIG. 7 is a schematic view similar to FIG. 6, illustrating the application of fluid to the filler for releasing the compressed filler material.

FIG. 8 is a schematic view showing the filled container or tank of FIGS. 6 and 7.

DETAILED DESCRIPTION

Referring to the drawings, FIG. 1 illustrates an elongated filler strip comprising a compressed filler 11 encased within a wrapper 12. The wrapper may be formed of upper and lower wrapper halves 13 and 14 made of sheets of plastic material which are heat-welded together along their side edges to form seams 15.

The strips are roughly in sausage-like or rod-like shape, although the particular cross-sectional shape may vary. Likewise, the wrapper may be formed of a single, extruded monolithic tubular shape, like some sausage casings which are filled after the casing is preformed. Alternatively, the casing may be formed from a single sheet whose opposite edges are fastened together, as by heat welding, to form the tubular shape. Also, instead of heat welding, stitching may be used for fastening.

The filler material is formed of an open-cell plastic, such as a polyether material, whose open cells are interconnected and also open to the exterior surfaces of the filler material. Such filler material is preferably formed of small pieces of plastic, such as elongated strips 16 (see FIG. 4) or roughly cube-like shapes 17 (see FIG. 5) or irregular shapes. Significantly, the relatively small pieces of filler material are bundled together and tightly compressed so that they may be physically separated upon release of the compression. Because the pieces are formed of a resiliently compressible and expandable plastic material, they self-expand upon release of the wrappers which hold them in compression.

The wrapper is preferably formed of a thin sheet of plastic material, which is flexible or bendable, but which is made of a plastic which is characterized by being soluble in the liquid which is to be stored or held within a particular container with which the filler is to be used. That is, in the case of an automobile gasoline tank, the cellular plastic material is characterized by being relatively inert to the gasoline. However, the wrapper material is substantially soluble in the gasoline. Likewise, if stitches are used, the thread is dissolve in the liquid to be stored.

The wrapper may be formed of a monolithic sheet, or alternatively, it may be formed of a plastic, net-type sheet material. Thus, FIG. 3 illustrates an alternative form of the wrapper wherein the strip 20, filled with the compressed foam filler 21, is surrounded by a wrapper sheet which is of a net-type material 22 whose plastic, net-forming fibers are soluble in the fluid placed in the container. The net wrapper may be made of a single, tube-shaped casing or may be made of two separate halves 23 and 24 which are heat-welded or stitched together along seams 25. Alternatively, a single wrapper sheet may be folded in half and heat-sealed along a single seam to make the tube-like casing.

The particular cellular plastic material selected should have a very minor portion of solid volume relative to the uncompressed volume of the material. For example, a suitable cellular material might have on the order of three percent or even less solid plastic which defines the cells. The cells, being open, receive the liquid so that the overall volume of the container is only slightly reduced by the presence of the expanded filler.

FIGS. 6–8 schematically illustrate the steps in filling the interior of a container 30 which is shown as an irregular-shaped automobile gasoline tank. The container, which is conventional, may be formed of metal or plastic material. A suitable filling opening 31 is provided in the container. The shape of the opening may be varied considerably depending upon the particular type of container and its intended use. For example, an automotive vehicle gas tank may be an elongated neck or tube with a conventional gas pump nozzle 32 inserted for pouring the fluid 33 into the tank.

In operation, referring to the gasoline tank example, a strip section 35 may be either cut from the elongated filler strip 10 or may be pre-cut or pre-sized to a specific predetermined length. The length of the section of compressed filler is correlated to the volume of filler material in the section when the material is uncompressed. The uncompressed material should be of a sufficient volume to fill the interior of the container to the extent desired. The section is inserted into the container through the opening 31 and allowed to drop to the bottom of the container. Preferably, the section of compressed filler material is inserted in the container when the container is dry or substantially dry. However, depending upon the rapidity of dissolution of the casing within the liquid, the section of filler may be inserted when the tank contains fluid.

After the compressed filler section 35 is inserted in the container, as shown in FIG. 6, the usual fluid to be contained within the container or tank is poured into the container. Thus, FIG. 7 schematically illustrates a typical gasoline station pump nozzle 32 inserted in the opening 31 of the gasoline tank for pouring the gasoline fluid 33 into the tank. Because the casing is soluble in the fluid, it begins to dissolve, thereby releasing the pieces of plastic material which resiliently expand.

As shown in FIG. 8, assuming the quantity of compressed plastic material is selected to completely fill the interior of the container upon release of the casing, the pieces of filler material tend to work their way into the various-shaped portions of the interior of the container and ultimately to substantially uniformly fill the interior of the container. This provides the foam plastic baffle which substantially reduces sloshing of the liquid which otherwise occurs during rapid changes in the direction of movement of the vehicle. In the event of rupture of the container, such as in an accident in which a fuel tank is damaged, the liquid is prevented from rapidly spurting out of the tank which avoids fire hazards that have occurred in the past in gas tank rupture accidents.

The particular size and shape of the filler strip may be varied. For example, a typical filler strip may be on the order of about one inch in diameter and, for example, eight to twelve inches length up to several feet in length, depending upon the interior volume of the container to be filled. Where the fillers are to be used for a large number of a particular kind of container, they may be preformed in separate sections, ech of the desired length. Alternatively, they may be formed in other shapes that may be capable of insertion in the container, as for example, as elongated, block-like shape.

The direction of expansion of the filler, when it is released from its casing, is generally opposite to its direction of compression. Thus, by compressing the filler radially inwardly relative to a tube-like casing, the filler will expand generally in a radially outwardly direction when released. This directional expansion control feature may be incorporated in determining the best size and shape to use in filling a particular size or shape container.

The materials used for the filler and casing may be varied depending upon such factors as the type of liquid involved, temperature conditions, costs, availability of materials, type of container, etc. By way of example, the filler may be made of a non-reticulated, open-cell polyether foam having a void percentage of about 98.4%, a density of about $1.00 \pm 0.05$ lb/st$^3$, a compression set of about 16% at 50% deflection, per ASTM D 3574, and a compress deflection of 0.35 at 25% and 0.50 (P.S.I.) at 65%, per ASTM D 3574. Another example is a reticulated open cell polyether foam having a void percentage of 97.7%, density of $1.43 \pm 0.08$ lb/st$^3$, compression set of 16% at 50% deflection, per ASTM D 3574, and a compress deflection of 0.35 at 25% and 0.50 (P.S.I) at 65%, per ASTM D 3574. Such fillers are identified as Scotfoam Corporation type Scotfoam C100-30 Polyether and Scotfoam Protectair II, 20 ppi, respectively. Moreover, a mixture of both may be used, as for example 75% of the first mixed with 25% of the second.

An example of a suitable casing is plastic netting made of 100% Nylon 6/6, 40 Denier thread with a 19×12 mesh count.

This invention may be further developed within the scope of the following claims. Accordingly, the foregoing description should be read as illustrative of an operative embodiment of this invention.

We claim:

1. A method for filling a container that is used for fluid storage with a cellular foam plastic filler, whose cells are interconnected, for baffling the fluid within the container, comprising essentially the steps of:
   tightly compressing the filler, which is formed of a resiliently compressible and expandable foam plastic of a type having open, interconnected cells which also open outwardly of the filler surfaces and whose solid, cell wall-forming portions constitute a minor part of the volume of the uncompressed filler, and which plastic is substantially chemically inert relative to the fluid to be placed in the container;
   wrapping the compressed filler within a surrounding casing which holds the filler in compression, with the casing being formed of a thin, flexible material which is sufficiently dissolvable by the fluid to release the compressed filler;
   placing a predetermined volume of casing-wrapped, compressed filler within a container that is to be filled and substantially closing the container;
   placing fluid in the container and substantially dissolving the casing with such fluid for releasing the filler from the wrapper so that the filler resiliently expands and substantially fills the container;
   whereby the volume of the container, when filled with the filler, is reduced only a minor amount by the filler and fluid may be later added and removed from the filled container, and said filler forms a baffle for the fluid within the container.

2. A method as defined in claim 1, and including compressing the plastic filler into an elongated strip whose cross-section is considerably less than its length, with the casing substantially surrounding the exterior surface of the strip;
   cutting predetermined length sections from the strip, with the volumes of such sections corresponding to the desired uncompressed volume for predetermined volume containers;
   and inserting said sections into containers to be filled.

3. A method as defined in claim 2, and including said casing being formed of a net-like material made of interconnected plastic fibers, with the material shaped into an elongated sleeve which surrounds the compressed filler;
   and with the plastic fibers forming said net-like material being substantially dissolvable by said fluid.

4. A method as defined in claim 2, and including said casing being made of a thin sheet of plastic formed into an elongated, roughly tubular shape which surrounds and encloses the compressed filler, and with the plastic forming the sheet being substantially dissolvable by said fluid.

5. A method as defined in claim 2, and said filler being formed of numerous, small pieces of plastic, which are physically compressed together to form said strip.

6. A method as defined in claim 1, and including forming a portion of the casing out of a material which dissolves in the fluid and forming a portion of the casing out of less dissolvable material.

7. A method as defined in claim 6 and including the less dissolvable portion of the casing being formed of a sheet-like wrapper arranged around the filler and securing the wrapper in its shape by thread-like material which forms the portion which dissolves in the liquid.

8. A method for filling a vehicle-type container, which is used for containing and storing a quantity of fluid within a vehicle, with a cellular plastic filler formed of a resilient, plastic material having interconnected cells, which also open to the exterior surfaces of the filler, and whose solid volume is a minor portio of the overall volume of the uncompressed material, that is, including the cells, and which plastic material is substantially inert to the fluid, comprising:
   tightly compressing pieces of said filler plastic material into an elongated, sausage-like strip and surrounding the compressed strip with a flexible, thin casing which holds the strip in compressed shape, and with the casing being formed of a thin sheet of a plastic material which is characterized by being substantially dissolvable by said fluid;
   inserting a predetermined length section of said strip into the container, with the length of the section corresponding to the desired volume of uncompressed filler needed for the particular container into which the strip is inserted;
   placing fluid in the container and substantially closing the container so that the fluid dissolves the casing sufficiently to free the compressed filler material so that it expands within and substantially fills the container.

9. A method as defined in claim 8, and including said casing being made of an open, net-like sheet material formed of plastic fibers which are substantially soluble in said fluid;
   and placing said sheet material around the compressed plastic filler.

10. A method as defined in claim 8, and including said casing being formed of a thin, flexible sheet of a plastic material characterized by being substantially soluble in said fluid.

11. A method as defined in claim 8, and said filler being formed of numerous, small, separate pieces of foam plastic which are compressed together to form the compressed filler that is arranged within the casing.

12. A method as defined in claim 11, and including forming said strip in a length of more than a number of said sections, cutting sections of predetermined length from said strip, and inserting at least one of said cut sections into the container.

13. A baffling filler for a container for holding liquids, comprising:
   said filler being formed of resilient, cellular plastic material which is characterized by being resiliently compressible and expandable, and having interconnected cells which also open to the exterior of the material, and with the volume of the solid plastic defining the cells being a minor portion of the overall volume of the material;
   said material being tightly compressed and being substantially encased within a thin casing formed of a sheet of material which is substantially soluble in said liquid;

and said compressed casing-surrounded material being insertable in a container and being resiliently expandable, to substantially fill the container, when the casing is dissolved by the liquid to permit the compressed filler material to resiliently expand within the container.

14. A filler as defined in claim 13, and said filler material being compressed in the form of an elongated strip from which predetermined length sections may be cut for providing separate, casing-covered, compressed sections containing compressed plastic material whose uncompressed volume is correlated to the amount of filler to be formed within the container.

15. A filler as defined in claim 14, and said filler being formed of numerous, small, separate pieces of plastic, which are physically compressed together and surrounded by the casing, and which are otherwise unconnected.

16. A filler as defined in claim 15, and said casing being formed of an open, net-like sheet, whose net-forming fibers are substantially soluble within the liquid.

17. A filler as defined in claim 15, and said casing being formed of a thin, flexible plastic sheet which is dissolvable by the fluid.

* * * * *